United States Patent Office 2,851,811
Patented Sept. 16, 1958

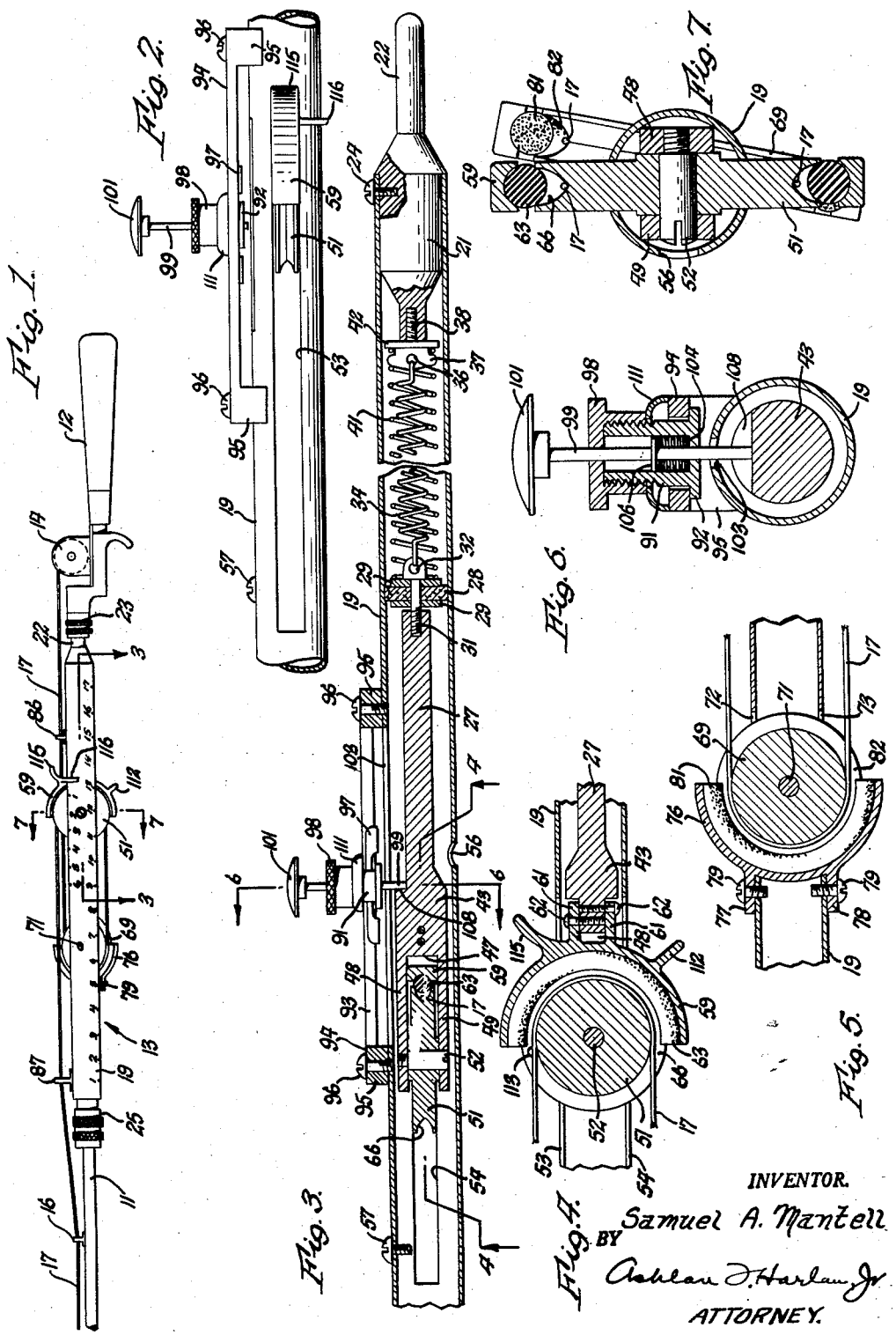

2,851,811

FISHING ROD

Samuel A. Mantell, Niagara Falls, N. Y.

Application August 8, 1955, Serial No. 527,002

6 Claims. (Cl. 43—15)

The invention of the present application relates to fishing apparatus and is particularly concerned with a shock-absorbing fishing rod.

It is an object of the present invention to provide a fishing rod which is equipped with means independent of the reel for placing tension on the line.

Another object of the present invention is to provide, in a fishing rod, automatic means for placing spring tension on the line when the pull of a fish on the line is resisted by the reel.

A further object of the present invention is to provide a fishing rod which is equipped with means whereby a snap or jerk may be given the line when a fish strikes at the lure or bait.

Another object of the present invention is to provide a fishing rod which permits play of a hooked fish without danger of the line being broken or snarled.

Another object of the present invention is to provide a fishing rod of the character described in which there is at no time interference with use of the reel.

Still another object of the present invention is to provide a fishing rod which has incorporated therein means for determining the length and weight of a fish.

Other objects and advantages of the present invention will be apparent from the following description taken in conjunction with the accompanying drawings in which:

Figure 1 is a side elevation of a fishing rod constituting an embodiment of the present invention;

Figure 2 is a fragmentary, enlarged plan view of a portion of the fishing rod shown in Figure 1;

Figure 3 is a fragmentary, enlarged, longitudinal sectional view taken on the line 3—3 of Figure 1;

Figure 4 is a fragmentary, enlarged, longitudinal sectional view taken on the line 4—4 of Figure 3;

Figure 5 is a fragmentary, enlarged, longitudinal sectional view showing details of the stationary pulley and line guide shown in Figure 1;

Figure 6 is an enlarged, transverse sectional view taken on the line 6—6 of Figure 3; and Figure 7 is an enlarged, transverse sectional view taken on the line 7—7 of Figure 1.

In fishing, after a fish is hooked it is necessary to reel in the line attached to the hook so that the fish may be brought close enough to be netted or landed. It is usually difficult, if not impossible, to reel the fish in by merely turning the reel ordinarily employed with the fishing rod. It is, therefore, customary to move the rod to pull the fish nearer, and then to reel in the line rapidly when the rod is relaxed to give some play or slack in the line. This is a tiresome procedure and, furthermore, is not always effective since the fish may jerk the line at the wrong moment and cause it to break or prevent the occurrence of slack which may be reeled in. By means of the present invention spring tension is applied to the line, when needed, to absorb shocks and prevent breaking of the line. The spring tension also provides a continued resistance to efforts of a hooked fish to draw out the line, whether the fisherman is reeling in the line or not.

In Figure 1 there is shown a sectional rod as a preferred embodiment of the invention. Here a standard rod blade 11 and a standard fishing rod handle 12 are attached to the opposite ends of an intermediate tubular, rod-section, generally designated by the reference numeral 13. A winding reel 14, which may be of conventional construction, is carried by the handle 12 and longitudinally spaced guides 16, also of conventional construction, are provided on the blade 11 for the line 17.

The intermediate section 13 of the rod is preferably formed of a light metal tube 19. At its inner end, that is at the end nearest the handle 12, the tube 19 is closed by a plug 21. The latter has an outwardly projecting, reduced portion 22 adapted to be received and held in a conventional chuck or collet 23 provided on the handle 12. The plug 21 is held in the end of the tube 19 by a retaining screw 24. A chuck or collet 25 is provided at the other end of rod section 13 for holding the blade 11.

Further provided within the tube 19, for longitudinal, sliding movement therein, is a plunger 27. At the end of the plunger 27 adjacent the plug 21 there is provided a washer 28 which may conveniently be made of leather, impregnated felt or the like and which fits snugly within the tube 19. The washer 28 is removably mounted between a pair of clamping washers 29 and is held on the end of the plunger 27 by a screw 31 having an eye 32 in the outer end thereof.

A coiled tension spring 34 in the tube 19 has one of its ends engaged in the eye 32 of the screw 31 and the other of its ends engaged in the eye 36 provided in the enlarged head 37 of a screw 38 that is threadedly engaged in the inner end of the plug 21. Movement of the plunger 27 away from the plug 21 is thus resiliently restrained. A coiled compression spring 41 is also provided between the plunger 27 and the plug 21. The spring 41 bears at one end against one of the washers on the inner end of the plunger and at its other end bears against a washer 42 that is clamped to the plug 21 by the screw head 38. The compression spring 41 cushions movement of the plunger 27 toward the plug 21 under the influence of the tension spring 34.

The end 43 of the plunger 27 that is more distant from the plug 21 is enlarged and provided with a longitudinal, vertical terminal slot 47. A yoke is thus formed, between the arms 48 and 49 of which a pulley 51 is rotatably mounted on a shaft or pin 52, one end of which is screwed into the yoke arm 48. The pulley 51 rotates in a plane parallel to the axis of the rod. As shown in Figure 7 the plunger end 43 is slidably supported within the tube 19 by the yoke arms 48 and 49.

The pulley 51 which is movable with the plunger 27 is of greater diameter than the tube 19 and, accordingly, the wall of the tube is provided with upper and lower longitudinal slots 53 and 54 through which the pulley 51 projects. There is also formed in the tube wall a port 56 through which access to the shaft 52 may be obtained for mounting and dismounting the pulley in the slot 47. The slots 53 and 54 are, of course, substantially longer than the diameter of the pulley 51 to permit longitudinal movement of the pulley along with the plunger 27. A stop screw 57 is provided in the tube for engagement with the yoke arm 48 to limit movement of the plunger and pulley away from the plug 21.

The pulley 51 is provided with a substantially semi-cylindrical line guide or retainer 59 that extends around the inner portion of the pulley within the slot 47. The guide 59 is preferably formed as a metal casting and is provided on its outer face with a pair of spaced, parallel lugs 61 by which it is secured by screws 62 to a portion of the plunger end 43 adjacent the slot 47. Within the arcuate metal line guide 59 there is secured, as best shown in Figures 4, 5 and 7, a rubber or plastic member 63 that is substantially circular in cross section and of such a diameter as to extend into the outer portion of the groove 66 in the pulley 51. The rubber or plastic insert 63 may be secured in a groove in the guide 59 by cement or by other suitable means. As will be evident from Figure 7, the line 17 is prevented by the plastic or rubber member from jumping out of the pulley groove and thus causing snarling or tangling of the line.

The movable pulley 51 is intended to be used in conjunction with another, stationary pulley 69 which is also mounted on the intermediate rod-section 13 as shown in Figure 1, both pulleys being aligned with the longitudinal axes of the rod-section 13 and the blade 11. The construction and arrangement of this pulley and the guide 76 therefor may be more clearly seen in Figure 5. The pulley 69 is rotatably mounted on a pivot pin 71 that is threadedly engaged at one end in the wall of the tube 19. As shown in Figures 1 and 7, the pulley 69, which projects outwardly beyond the wall of the tube 19 through diametrically located, longitudinal slots 72 and 73 formed in the tube wall, is mounted for rotation in a plane which is parallel to the rod axis but angularly offset from the plane of rotation of the movable pulley 51. The reason for this, of course, is to prevent interference of the line 17 in its passage around the two cooperating pulleys.

A line guide 76, similar to the guide 59, is provided for the pulley 69. The guide 76 extends through the slots 72 and 73, and is provided on its outer surface with a pair of spaced lugs 77 and 78 which are secured to the wall of the tube 19 by screws 79. Like the guide 59, the guide 76 is provided with an interior insert 81 of rubber or plastic, of substantially circular cross-section which insures the line 17 remaining in the groove 82 of the pulley 69.

As will be seen from Figure 1, the line from the reel 14 extends through a guide 86 on the rod-section 13, around the stationary pulley 69, back around the movable pulley 51, forwardly through another guide 87 and thence through the guides 16 provided on the blade 11 to its free end, to which there may be attached the usual lure, fly or other bait (not shown). As a consequence, with the reel 14 held against turning, whether by locking or by manually holding it against rotation, a pull on the line 17 by a fish hooked thereon will cause outward movement of the movable pulley 51 against the tension of the spring 34. When the pull on the line is relaxed the spring 34 will tend to return the pulley 51 to the normal position shown in Figures 1 and 2.

This novel arrangement insures against breaking of the line in the event a large fish suddenly takes the hook while the line is held against movement at the reel. The stress of the jerk given by the fish will be cushioned or absorbed in the stretching of the spring 34 as the pulley 51 moves outwardly toward the rod tip. This novel arrangement also permits large or active fish to be reeled in more conveniently. As is well known, in order to reel in a large or active fish it is necessary to pull the fish in by movement of the rod and then, while the rod is relaxed, attempt to take the slack in the line by rapidly reeling it in. By the pulley arrangement here provided the line is held under more nearly constant tension at all times and reeling in of the line is made easier. It will be noted, however, that there is no holding of the line and consequently the line may be let out or reeled in at any time.

The construction that permits the application of tension to the line 17 by the movable pulley 51 and the spring 34 also permits the use of the present apparatus for automatically setting the hook attached to the line when a fish strikes. To permit such employment, there is provided on the side of the intermediate rod-section 13 an adjustable detent or latch. In the embodiment illustrated, the detent comprises a cylindrical barrel 91 having an enlarged base 92. The barrel 91 projects upwardly through and is slidable in a slot 93 in an elongated guide bar 94. The latter extends longitudinally of the tube 19 and is spaced laterally therefrom by feet 95 at its extremities. Suitable means such as screws 96 may be employed to secure the bar 94 to the tube. The barrel 91 is provided with ears or wings 97 that project from its sides into the slot 93, thus preventing turning of the base 92.

At its upper end the barrel 91 is provided with external threads upon which a nut 98 engages. A movable pin 99 having an enlarged head 101 extends through the nut 98 and the base 92 of the barrel 91 and is adapted to project into the interior of the tube 19 through a longitudinally extending slot 103 formed in the latter. Within the barrel 91 there is arranged a coiled compression spring 104 which is held between the base 92 of the barrel and a collar or shoulder 106 provided on the pin 99. When the plunger 27 carrying the movable pulley 51 is pulled away from the plug 21 within the tube 19 the pin 99 may be pushed inwardly to engage behind a shoulder 108 formed at the inner end of the enlarged portion 43 of the plunger 27. The pin 99 will remain depressed holding the plunger 27 against tension of the spring 34 so long as the friction between the end of the pin and the shoulder 108 is sufficient. The force exerted by the spring 34 is normally enough to hold the shoulder 108 against the pin sufficiently tightly.

When, however, a fish strikes or seizes the lure, fly or other bait on the end of the line 17 the slight pull exerted on the line will result in the movable pulley 51 being moved slightly toward the tip of the rod. Consequently, the friction between the shoulder 108 and the pin 99 is reduced and the pin is thereupon retracted by the spring 104 acting on the shoulder 106 thereof. The pulley 51 is then quickly pulled toward the handle of the rod by the spring 34, jerking the line 17 and setting the hook in the mouth of the fish. The intensity of the jerk given the line is, of course, dependent upon the distance which the plunger has been pulled away from the plug 21 with consequent stretching of the spring 34.

The detent comprising the pin 99 may be moved longitudinally of the tube 19 between set limits by adjusting it on the guide bar 94. Thus the degree to which the spring 34 is stretched by the plunger when the latter is held by the detent can be varied. As most clearly shown in Figure 6, the lower end of the nut 98 is adapted to engage a washer 111 resting on the guide bar 94, and thereby, when tightened, to clamp the enlarged base 92 of the barrel 91 against the guide bar and hold the detent in adjusted position. An outwardly projecting finger piece 112 is provided on the line guide 59 by which the movable pulley and plunger 27 may be conveniently pulled forwardly when setting the detent to hold them in extended position. Shock resulting from the quick return to normal position of the plunger 27 when released by the detent is prevented by the dash-pot effect of the washer 28 compressing air in the tube 19 and the resistance to compression of the spring 41.

The fishing rod of the present invention also includes other useful and novel features. These include the small holes 113 provided in the sides of the grooves of the two pulleys 51 and 69. Because the line guides for the pulleys fit so closely around the pulleys, threading a line through the pulleys would ordinarily present some difficulty. However, by merely pushing the end of the line 17 through the hole 113 from the inside of the groove and rotating the pulley by hand the line is held in place while passing around the pulley. The line end can then be withdrawn and threading through the other appropriate passages and guides can be continued.

It will also be seen that the exterior of the intermediate rod-section 13 is provided with two sets of longitudinally arranged indicia. As viewed in Figure 1, the lower set of indicia constitutes a measuring scale from which the length of a fish may conveniently be determined. Any desired units, of course, may be provided on this scale. The upper set of indicia is for use in weighing fish. For this purpose the tension spring 34 may be regarded as part of a spring balance and its elongation under load may be considered proportional to the load applied. Therefore, if the rod is held in vertical position with the handle uppermost and a weight, such as a fish, is hung from the hook 115 that projects outwardly from the line guide 59 above the tube 19, the downward movement of the plunger 27 will correspond to the weight thereon. A finger 116 which may be integral with the hook 115 is provided to indicate the weight in cooperation with the indicia provided. It will be realized that the tension spring 34 employed may be precalibrated or may be calibrated after assembly of the rod and the indicia may then be applied.

It will be seen from the foregoing that fishing rods constructed in accordance with the invention of this application are highly useful and present numerous advantages. No longer need a fisherman using light tackle fear the loss of a valued fly or lure or the snapping of his rod when the hook is taken by an unexpectedly large fish. The resistance of the spring 34 will snub the lunges of the fish and prevent damage to the tackle. In addition, as pointed out above, reeling in a hooked fish is made easier by the novel pulley arrangement of the present invention. Furthermore, the movable pulley and plunger can be used in weighing fish or, in conjunction with the adjustable detent provided, as an automatic hook-setter.

In connection with the last-mentioned use, it is particularly to be observed that the line on the present, novel fishing pole is always free and may be reeled in or played out at any time without interference. Hook-setting devices previously known positively grip the line at some point so that after being prepared for use the length of the line can not be changed without releasing it and starting over. Also to be noticed is the fact that the line on the rod of the present invention is permanently threaded, i. e., after once threading it on the rod no further or additional threading is necessary until a new line is put on. Previous hook-setting devices usually require threading of the line through grips or triggers each time they are used. Attention is further directed to the fact that the rod of the present invention is provided with means which prevents snarling or tangling of the line by keeping the line on the pulleys at all times.

It is to be understood that, although the preferred embodiment of the present invention has been described and illustrated herein, the invention may take other forms and various modifications of and variations in the preferred embodiment may be made without departing from the spirit of the invention. Thus, it is preferred to make the rod sectional, with the blade and handle easily removable from the intermediate section, since longer or shorter blades and handles which properly balance therewith may thereby be conveniently substituted when desired. Nevertheless, the rod could be formed in one piece. Many other details of construction may likewise be modified. For example, if desired, the plug 21 may be threaded into the end of the tube 19 or the pulleys may be mounted on anti-friction sleeves or the detent may be differently constructed or mounted.

Accordingly, it is not intended that the invention should be construed as limited to the structure illustrated and described but rather that it should be given as broad an interpretation as permitted by the appended claims.

I claim:

1. A fishing rod and hook setting device comprising a handle adapted to carry a reel, a blade adapted to carry line guides, and an intermediate tubular section connected at one end to said blade and at its other end to said handle, said intermediate section having pairs of spaced slots formed through the walls thereof and containing a plunger movable longitudinally thereof in the vicinity of one pair of said slots, resilient means for restraining said plunger against movement away from said handle, a first pulley carried by said plunger and movable therewith, said first pulley being disposed in said one pair of slots, and a fixed pulley mounted in the other pair of said pairs of slots and longitudinally spaced toward said blade from said first pulley, each of said pulleys being aligned with the longitudinal axes of said section and said blade, whereby a line may be extended from said reel around said fixed pulley, then around said movable pulley and along said blade to a position wherein it may be used for fishing.

2. Apparatus as set forth in claim 1 wherein said pulleys are in planes angularly offset one from the other.

3. A fishing rod as set forth in claim 1 in which said blade and said handle are detachably connected to said intermediate section.

4. A fishing rod as set forth in claim 1 in which means is provided for cushioning movement of said first pulley away from said fixed pulley.

5. A fishing rod as set forth in claim 1 in which a detent is provided on said section to releasably hold said first pulley in a predetermined position against the action of said resilient means.

6. A fishing rod as set forth in claim 5 in which said detent is longitudinally adjustable.

References Cited in the file of this patent

UNITED STATES PATENTS

| 686,647 | Booth | Nov. 12, 1901 |

FOREIGN PATENTS

| 475,440 | Italy | Oct. 29, 1952 |
| 633,322 | France | Jan. 27, 1928 |